March 21, 1967 A. F. PADDOCK 3,310,712

COMMUNICATIONS CIRCUIT PROTECTOR

Filed June 16, 1965 4 Sheets-Sheet 1

Inventor
Alvin F. Paddock

By

Hume, Groen, Clement, & Hume.
Attys.

COMMUNICATIONS CIRCUIT PROTECTOR

Filed June 16, 1965 4 Sheets-Sheet 2

Inventor
Alvin F. Paddock
By
Hume, Groen, Clement, & Hume.
Attys.

Inventor
Alvin F. Paddock
By Blume, Groen, Clement, & Blume
Attys.

COMMUNICATIONS CIRCUIT PROTECTOR

Filed June 16, 1965 4 Sheets-Sheet 4

Inventor
Alvin F. Paddock
By
Hume, Groen, Clement, & Hume.
Attys.

United States Patent Office 3,310,712
Patented Mar. 21, 1967

3,310,712

COMMUNICATIONS CIRCUIT PROTECTOR

Alvin F. Paddock, Roselle, Ill., assignor to Cook Electric Company, Morton Grove, Ill., a corporation of Delaware

Filed June 16, 1965, Ser. No. 464,445
13 Claims. (Cl. 317—120)

The invention relates to a new and improved protector for communications circuits, and more particularly to a new and improved housing thereof.

One object of the present invention is to provide a new and improved communications circuit protector which provides improved protection from weather and tampering and an improved mounting.

Another object of the invention is to provide a protector housing with improved convenience in the mounting of the base, improved wiring convenience and improved mounting of the cover means to the base.

A further object of the invention is to provide a new and improved protector housing with reduced current leakage.

It is a more particular object of the present invention to provide a protector housing with novel covert latching means resisting removal of the cover by unauthorized personnel and providing improved retention of the cover.

Further objects and advantages of the present invention will appear from the following description, taken with the accompanying drawings, in which.

The above and other objects of the present invention are achieved by providing a new and improved protector device having particular application in the communications circuit protection art. The protector device embodies a housing that is adapted to be maintained in a detachable relationship by means disposed within the housing and not viewable from its outside. In one aspect of the invention, the housing is constructed so that the internal conductors are located entirely within a base member to provide complete insulation and reduced leakage current. In another aspect of the present invention, the base member is constructed so that it can be readily mounted to a suitable support without critical prealignment procedures. In a further aspect of the invention the protector device can be wired more rapidly than prior art protector devices embodying conventional wire entrance means.

FIGURES 1–8 are illustrative of an exemplary fuseless protector 10, and FIGURES 11–17 are illustrative of a similar but fuse-type, protector 12. The protector 10 will be described first, and this description is equally applicable to corresponding components in the protector 12.

Figures 1, 2:
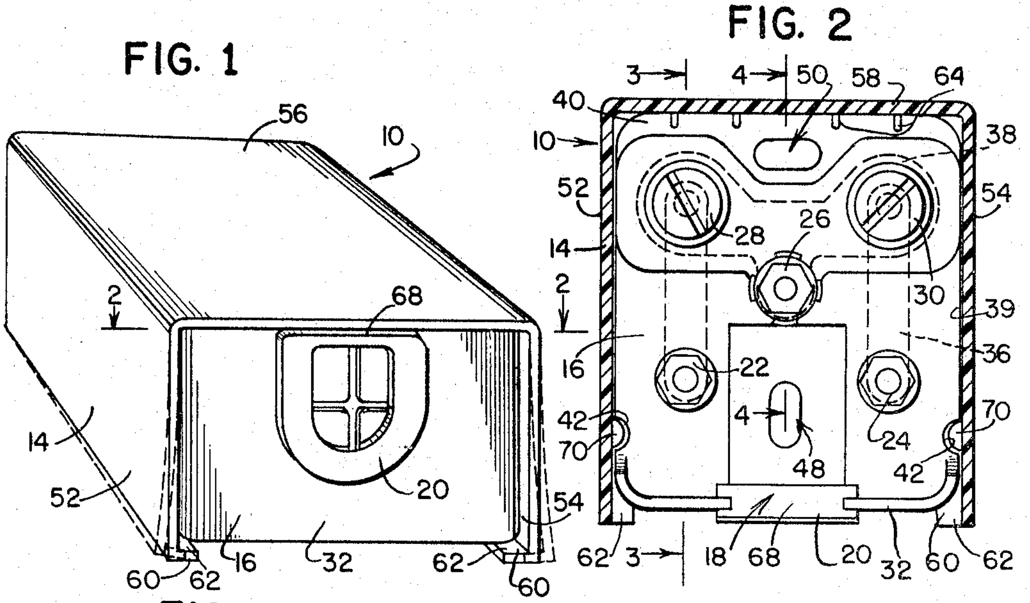
FIGURE 1 is a perspective view of a fuseless protector to be described as an illustrative embodiment of the present invention.
FIGURE 2 is a cross sectional view of the embodiment of FIGURE 1 along a line 2—2 in FIGURE 1.
Figure 3:
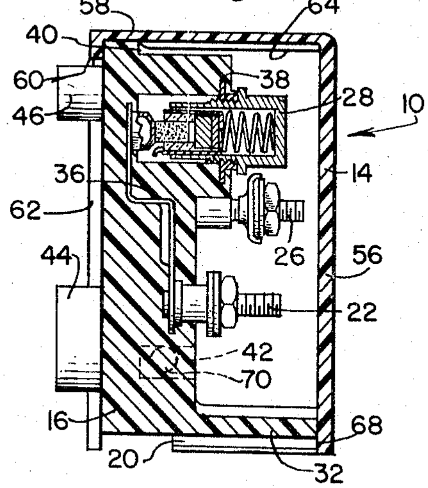
FIGURE 3 is a cross sectional view of the embodiment of FIGURES 1 and 2 along the line 3—3 in FIGURE 2.
Figure 4:
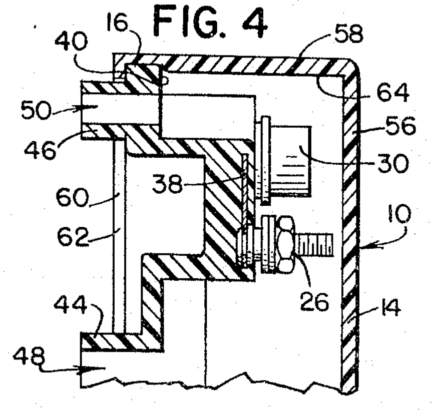
FIGURE 4 is a partial cross sectional view of the embodiment of FIGURES 1–3 along the line 4—4 in FIGURE 2.
Figure 5:
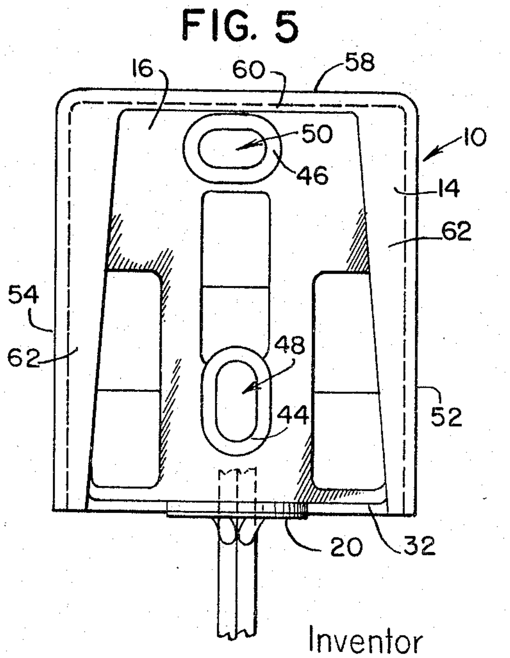
FIGURE 5 is a bottom plan view of the embodiment of FIGURES 1–4.
Figure 6:
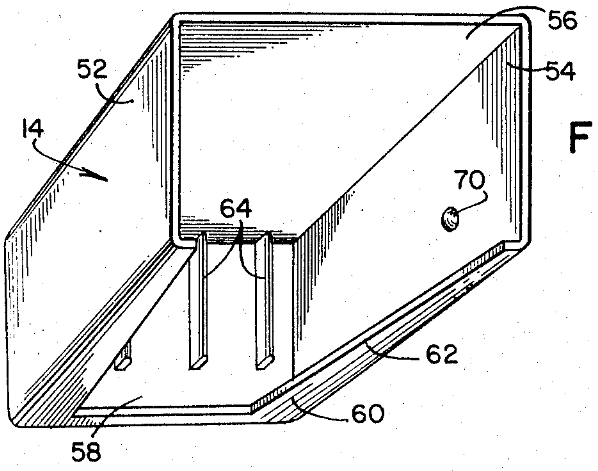
FIGURE 6 is a perspective view of the cover of the embodiment of FIGURES 1–5.
Figures 7, 8, 9, 10:
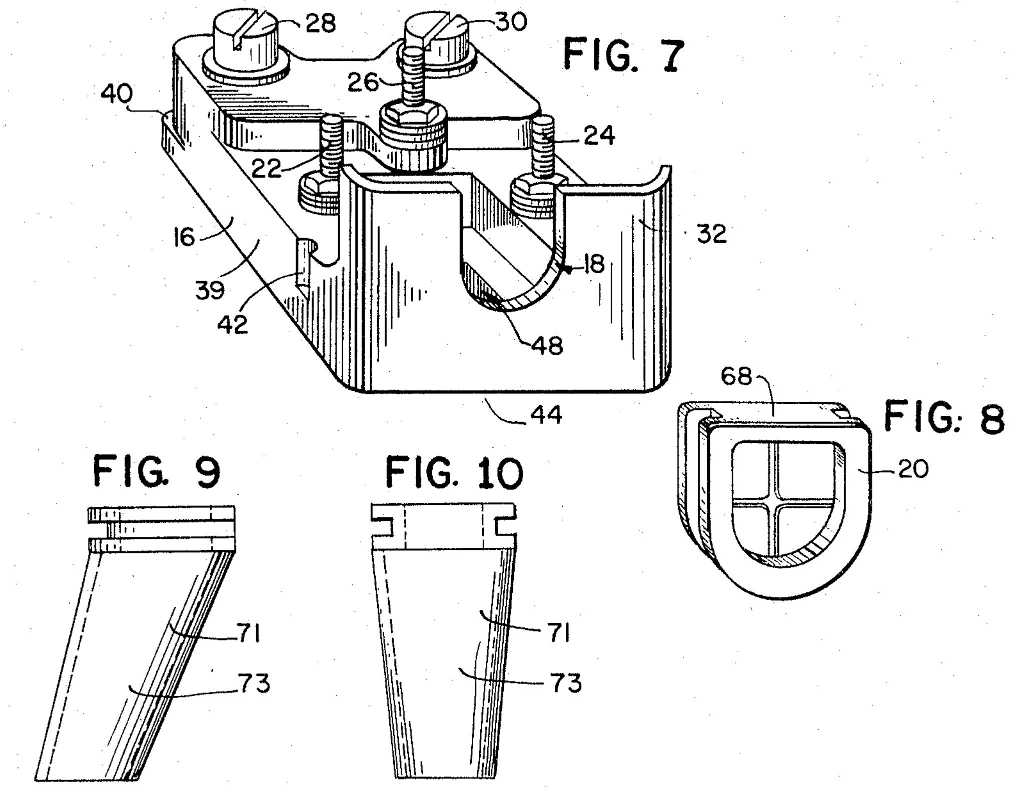
FIGURE 7 is a perspective view of the base of the embodiment of FIGURES 1–5.
FIGURE 8 is a perspective view of the grommet of the embodiment of FIGURES 1–5.
FIGURE 9 is a side view of another embodiment of the grommet of FIGURE 8.
FIGURE 10 is a top view of the grommet of FIGURE 9.
Figures 11, 12, 13, 14:
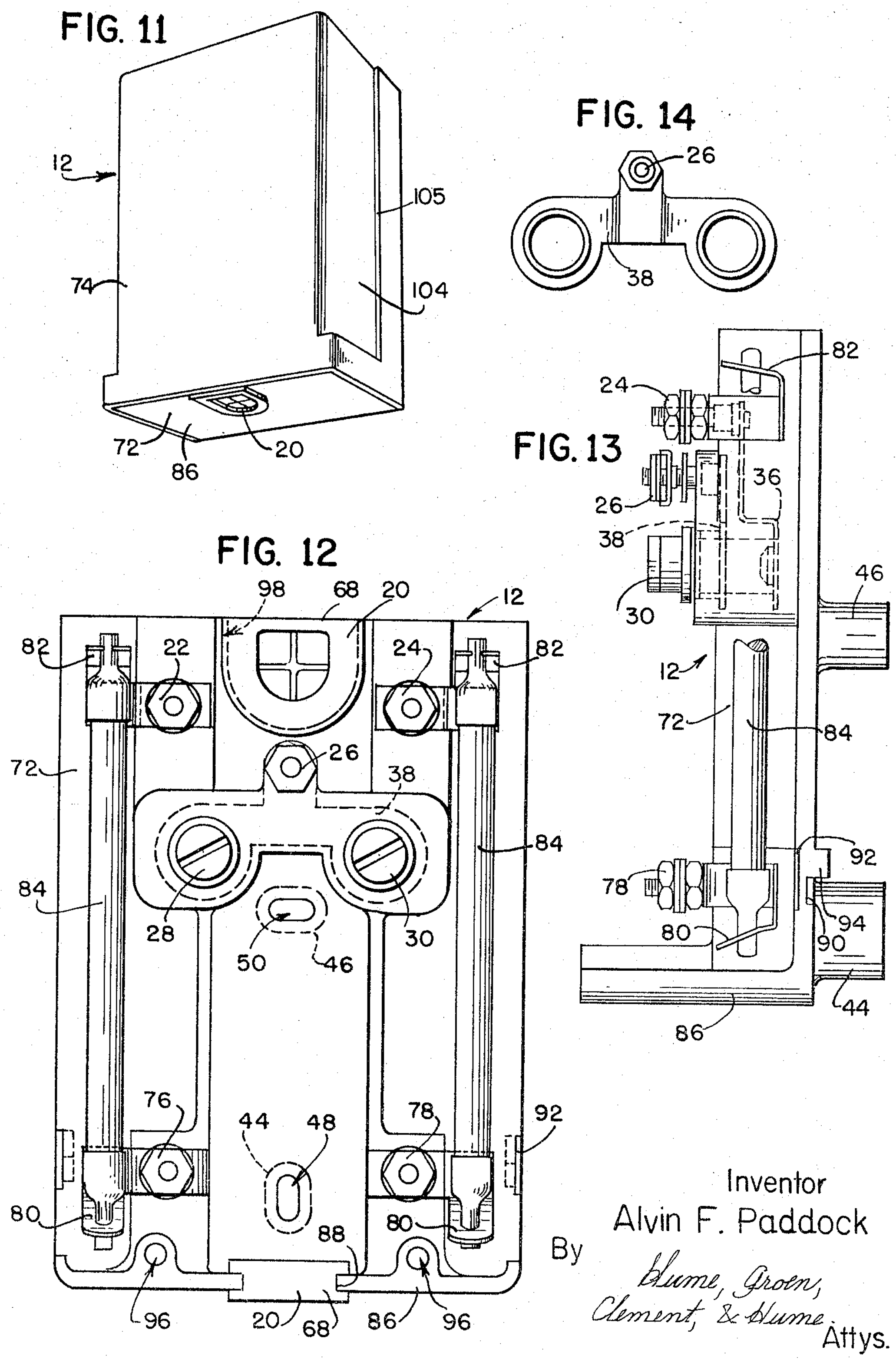
FIGURE 11 is a perspective view of a fuse type protector to be described as an illustrative embodiment of the present invention.
FIGURE 12 is a top plan view of the embodiment of FIGURE 11 with the cover removed.
FIGURE 13 is a side view of the embodiment of FIGURES 11 and 12 with the cover removed.
FIGURE 14 is a plan view of the ground conductor in the embodiment of FIGURES 11–13 and in the embodiment of FIGURES 1–5.
Figure 15:
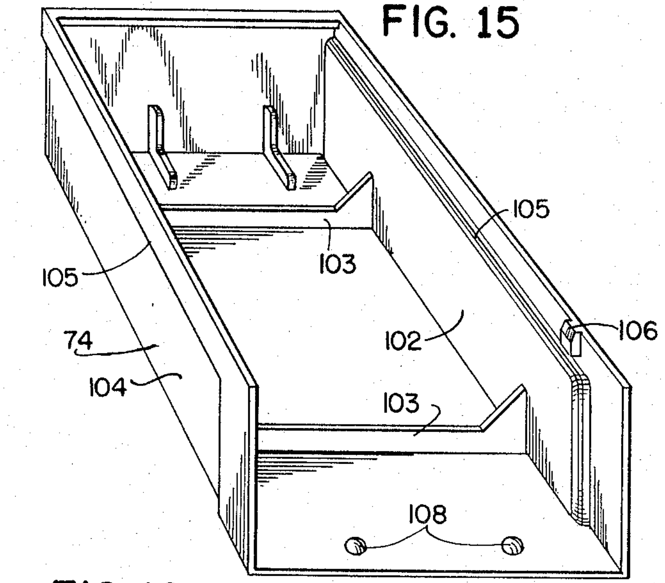
FIGURE 15 is a perspective view of the cover of the embodiment of FIGURES 11–13.
Figure 17:
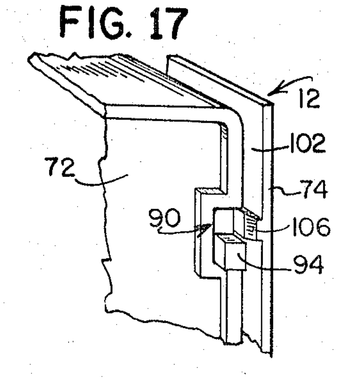
FIGURE 17 is a partial perspective bottom view of the embodiment of FIGURES 11–13 illustrating cover latching means.

FIGURES 1 and 5 show a perspective and bottom view of the protector 10 fully assembled. A cover 14 preferably encloses a base 16 and forms a weather protecting covering thereover. Mounted in an edge notch 18 in the base 16 is an electrical wiring grommet 20, which is additionally retained by the cover 14. FIGURES 6, 7, and 8 together form in effect an exploded view of the protector 10 and illustrate the separability of the cover 14, base 16 and grommet 20.

The electrical function of the fuseless protector 10 is to provide a protection to a communications circuit from voltage overload conditions. To these ends the base 16 is provided with a plurality of electrical elements mounted thereon, including a pair of communications circuit terminals 22 and 24, a ground terminal 26 and a pair of over voltage protectors 28 and 30 which connect the communications circuit terminals to the ground terminal under a voltage overload condition.

The over voltage protectors 28 and 30 are preferably of a known and accepted type, and need not be described herein. As illustrated in cross section in FIGURE 3, they each provide an air gap for lightning or other voltage surges. A fusible disc provides protection against power line cross or other extended voltage overload by causing permanent shorting of either or both of the protectors, 28 and 30 to a communications circuit terminal and thereby grounding the telephone line to the ground terminal 26.

Examining in detail the base 16 of the protector 10, this base is preferably formed as a unitary casting or molding of phenolic plastic or other suitable insulation material, with the above electrical elements secured thereto in the molding operation. The general configuration of the base is preferably substantially rectangular, with an upstanding wall 32 at the front portion thereof. This wall 32 preferably has the generally U-shaped notch 18 in the upper edge thereof. As may be seen from FIGURE 1 the wall 32 preferably provides the entire front enclosure or wall of the protector 10, with the grommet 20 mounted within and fully occupying the notch 18.

The protector 10 provides substantially reduced electrical current leakage by an internal configuration of the electrical interconnections for the above mentioned electrical elements in the base. In the protector 10 preferably all the interconnecting conductors are entirely within the base 16. One electrical interconnection is by internal conductors 36 between each telephone circuit terminal and the base or "hot" terminal of one of the over voltage protectors. Another electrical interconnection is a ground connection between the ground terminal 26 and the shell of each of the other voltage protectors 28 and 30. This ground connection is preferably provided by a metallic ground plate 38 which is secured to the ground terminal 26 and provided with threaded mounting apertures for the over voltage protector shells. The ground plate 38 is preferably molded entirely internal to, and therefore insulated by, the base 16. This internal construction results in a substantial reduction in the current leakage due to moisture, cobwebs, etc., which previously occurred between the exposed ground plates and the communications circuit terminals.

The base 16 is adapted to mate with the cover 14 to form a protector 10 which is a weather tight unit, enclosing all of the electrical elements on the base. The base itself is preferably adapted to provide the bottom surface and front wall of the protector, and the cover provides the remaining surfaces. The base 16 is preferably adapted to closely fit and engage with the sides and rear wall of the cover 14. To these ends the sides 39 of the base preferably form substantially planar vertical surfaces extending the length of the base. A slight taper of approximately 2 degrees per side is preferred to assist in providing a close fit with the cover; i.e., the base is preferably slightly wider at its front portion (in the region of the front wall 32) than at the rear. As may be particularly clearly seen in FIGURE 7, there is preferably located near the front of the base 16 at each side 39 a vertical semi-cylindrical groove or other suitable recess forming a detent catch 42.

In the protector 10, the base 16 is preferably provided with a horizontal ledge surface 40 extending across the rear thereof. The ledge surface 40 is preferably spaced substantially below the remainder of the upper surface of the base. The function of this ledge surface 40 is to provide engagement with the rear wall of the cover, as will be explained hereinafter, allowing the over voltage protectors 28 and 30 to stand free of any adjacent projections from the base and thus providing substantial finger space for convenience in unscrewing them.

The base of the protector 10 preferably has apertured mounting studs which provide improved speed and convenience in the mounting of the base 16 to any selected mounting surface. The mounting surface (not shown) is generally a vertical surface of wood or other wall material, to which the base 16 is vertically mounted by screws or other desired fastening means. The preferred mounting disclosed herein comprises two similar stand-off legs or collars 44 and 46, each having a laterally elongate configuration. Corresponding elongate apertures 48 and 50 respectively extend through the collars 44 and 46. The collar 44 is preferably spaced from and at right angles to the collar 46. Thereby the elongate dimension of the aperture 48 is at right angles to that of the aperture 50. Among the advantages of this configuration is the fact that only two mounting screws need be mounted through the base, one through each of the elongate apertures 48 and 50, yet the elongate or wide footed configuration of the collars provides complete mounting stability. Most importantly, the previously somewhat critical locationing of mounting screws is eliminated. The mounting screws need not be either accurately aligned with or spaced from one another since one aperture 48 or 50 provides a substantial vertical adjustment and the other aperture provides a substantial horizontal adjustment. Accordingly a neat and rapid installation of the protector may be accomplished by movement of the base with respect to the screws to correct for misalignment in the screw locations.

Considering next the cover 14 of the protector 10, it is preferably of a unitary rigid plastic construction enclosing the base 16 and retaining the grommet 20. It provides, in combination with the base 16, a weather protective covering and covert latching means preventing the removal of the cover by unauthorized personnel.

The cover 14 preferably includes side walls 52 and 54, a top wall 56 and a rear wall 58, thus providing open or unoccupied areas only at the bottom and front thereof, to be closed by the base 16. For complete weather protection and for securing the cover to the base a continuous flange 60 is preferably provided projecting inwardly from the bottom edges of the side walls 52 and 54 and the rear wall 58, thus partially overlying the bottom surface of the base 16.

Previous protector covers have generally been manufactured of rubber or soft plastic so as to provide insulation plus sufficient flexibility and resilience for a weather tight mounting of the cover to the base. However, these materials have the disadvantage of deterioration under moderately high temperatures and limited physical protection. In contrast, the cover 14 preferably employs a high temperature rigid vinyl plastic material. The preferred material is a high temperature polyvinyl chloride, preferably polyvinyl dichloride. The term "rigid plastic" employed herein indicates a plastic having rigidity properties similar to this material. The cover 14 is so constructed that even though it is of rigid material it does provide resilient engagement of the base.

The resilient engagement of the cover with the base is preferably primarily provided by having the opposing side walls 52 and 54 stiffly resilient, i.e. providing resiliency yet having a relatively high restoring force. As illustrated by the dotted line configuration in FIGURE 1, the side walls are preferably cantilevered to provide an elongate leverage action upon the cover and allow the rigid cover material to be sufficiently outwardly deformed to mount the cover to the base. This beam deflection allows the bottom edges of the side wall to deflect substantially with only a small angular deformation of the cover material at any one region thereof.

The cantilevered construction of the side walls 52 and 54 is preferably provided by each side wall being integrally connected with the rest of the cover 14 only by a connection between the top edge thereof and the top wall 56 and between the rear edge thereof and the rear wall 58. Thus each side wall is completely unsecured along its front and bottom edge, and forms lever arms with respect to the rest of the cover corresponding to the length and height of the side wall.

An additional control over the resiliency characteristics of the cantilevered side walls is provided by tapered flange portions 62 of the flange 60. Each flange portion 62 preferably extends continuously along the bottom edge of each side wall and is tapered, being substantially thinner at the front or free end of the side wall then adjacent the rear wall 58. Being at right angles to the outward flexure movement of the side walls the tapered portions 62 provides a stiffening of the resiliency of the side walls and an improved distribution of the flexure movement and forces.

The cover 14 preferably embodies projecting ribs 64 on the interior surface of the rear wall 58. The ribs 64 extend downwardly to a spaced distance above the flange 60. The bottom edges of the ribs 64 thereby define a projecting flange which is adapted to vertically overlie and engage with the ledge surface 40 on the base 16. This provides a vertical securing of the rear wall 58 of the cover to the base. The flange defined by the ribs 64 prevents the base from moving vertically with respect to the rear wall, yet does not require any vertical projections from the base which would interfere with removal or installation of the over voltage protectors 28 and 30.

The cover 14 is preferably provided with covert or hidden latching means which cooperate with the resilient engagement of the cover side walls 52 and 54 against the base 16. Preferably near the forward edge of the interior surface of each side wall 52 and 54 is an inwardly projecting detent means, here provided by a small arcuate projection 70. The projection 70 is preferably spaced from the rear wall 58 by a distance corresponding to the spacing of the detent catch or recess 42 from the rear of the base 16. The dimensions of each projection 70 are preferably slightly less than those of a detent catch 42 on the base 16 so as to fully fit therein. Each projection 70 is preferably held in a detent catch 42 solely by the resiliency of the respective side wall.

Effective "tamperproof" retention of the cover to the base is provided by the above novel latching structure. The cover 14 may be inserted on the base 16 only by sliding forward over the base from the rear thereof, and must be slidably removed in a coresponding reverse manner. The removal movement is resisted by the engagement of each projection 70 with the concave surface of its corresponding detent catch 42. The projection 70 can only escape from retention by its detent catch by a substantial outward flexure of the side wall in the manner illustrated in FIGURE 1, and this flexure is opposed by the stiff resiliency of the side wall. Removal is most easily accomplished by first applying outward force to the side walls at the forward edge thereof, so that the side walls are outwardly flexed. The side walls preferably project slightly beyond the front wall 32 of the base to assist in this. With the side walls so flexed the projections 70 are disengaged from the detent catches 42 and the cover may be easily slid off the base.

The regular personnel familiar with the proper removal of the cover such as is described above can easily remove it. Where, however, removal is attempted by unauthorized personnel such as children the above method of removal is unobvious and will not normally be attempted. Rather the unauthorized personnel will attempt to lift or slide the cover off the base while grasping the cover around the outside thereof. This actually reinforces the effectiveness of the covert latching by adding to the forces holding the projection 70 on the detent catches 42. Thus the unauthorized personnel cannot, even by exerting considerable force, remove the cover in this manner. Further, the latching arrangement, being covert, cannot be visually determined. Thus the protector 10 is substantially tamperproof, without requiring a complex structure or locking arrangement which would be inconvenient or time consuming for the authorized personnel.

Considering next the grommet 20, it is preferably of a unitary molded rubber construction having a rupturable membrane in the central aperture portion thereof adapted to have electrical conductors forced therethrough as illustrated in FIGURE 5. Preferably the entire grommet 20 flushly fits within the notch 18 so as to provide an uninterrupted upper edge across the wall 32. Accordingly the upper surface 68 of the grommet is preferably adapted to be co-planar with the upper surface of the wall 32 when the grommet is completely inserted in the notch 18. This enables the cover 14 to retain the grommet in the notch by the top wall 56 of the cover overlying and contacting the surface 68 of the grommet.

With the cover removed the grommet 20 may be easily slidably removed from the edge notch 18. This is of great advantage in wiring in that the grommet may be passed over the end of the wiring as the wiring is prepared, and then the grommet (with the prepared wiring therethrough) secured to the base. This cannot be conveniently accomplished with the conventional grommet mounting, where the grommet is forcibly mounted through an aperture.

Disclosed in FIGURES 9 and 10 is an alternative embodiment of the grommet 20. This alternative grommet 71 is substantially identical with the grommet 20, but has added thereto an integral hollow tubular extension 73. The elongate extension 73 is adapted to enclose and weather protect the portion of a conductor adjacent but outside the base 16. It is particularly advantageous for a conductor which has its outer covering removed for insertion of wires through the grommet and would thereby otherwise be partially exposed.

Considering now the fuse type protector 12, as stated above, this structure is very similar (and identical in many respects) to the fuseless protector 10 described above. The protector 12 includes a base 72 similar to but larger than the base 16 and a corresponding cover 74 similar to the cover 14. The fuse type protector 12 provides the electrical functions of the fuseless protector 10, and accordingly preferably includes certain identical electrical components, including the pair of communications circuit terminals 22 and 24, the ground terminal 26, the over voltage protectors 28 and 30, the internal conductors 36 and the ground plate 38. However, in addition the protector 12 provides current overload protection by fuses 84 in series with the communications circuit. For this purpose there is preferably a second pair of communications circuit terminals 76 and 78, with a fuse end holder 80 connected to each. Each of the communications circuit terminals 22 and 24 preferably connects with a second fuse end holder 82 similar to the fuse end holder 80. A current overload fuse 84 preferably removably mounts between each fuse end holder 80 and the opposing fuse end holder 82. By spacing the telephone circuit terminals 76 and 78 at opposite ends of the base 72 from the terminals 22 and 24 there is provided sufficient spacing for the elongate fuses 84 and maximum electrical separation.

Considering the construction of the base 72 it will be observed the same mounting collars 44 and 46 are preferably provided. Further, as in the protector 10 there is preferably an upstanding wall 86 corresponding to the wall 32, and an edge notch 88 therein corresponding to the edge notch 18. Preferably the same electrical grommet 20 is retained in the notch 88, in the same manner.

In the protector 12 preferably the mounting of the cover to the base differs from the protector 10 in that instead of the cover sliding over the base, the cover 74 pivotally swings downwardly to enclose the base 72, rotating about the rear of the base. However, a similar covert latching means is provided. The base 72 is preferably adapted therefor by providing detent catch recesses 90 which correspond to the detent catches 42 in the protector 10. The catch recesses 90 are preferably on each side of the base near the front thereof. A beveled surface 92 is preferably on the upper surface of the base immediately overlying each catch recess 90. A lug 94 downwardly extending from the bottom surface of the base provides a reinforced rear stop at the rearward edge of the catch recess 90. Additional detent catch means are preferably provided by apertures 96 in the upper edge of the front wall 86.

The base 72 of the protector 12 preferably has an additional edge notch 98 for another grommet 20. The edge notch 98 is adjacent the communications "inside" line circuit terminals 22 and 24 and provides an aperture vertically through the base 72, whereas the edge notch 88 is through the front wall of the base adjacent the "outside" communications circuit terminals 76 and 78. This provides an advantage over prior fuse type protector designs in that since there are two separate wire entrances, each adjacent the respective terminal pairs, the communications lines need not be run any substantial distance inside the protector. Also the location of the edge notch 98 allows the "inside" lines to run directly from the base through the mounting surface if a "through the wall" wiring is desired.

Figure 16:
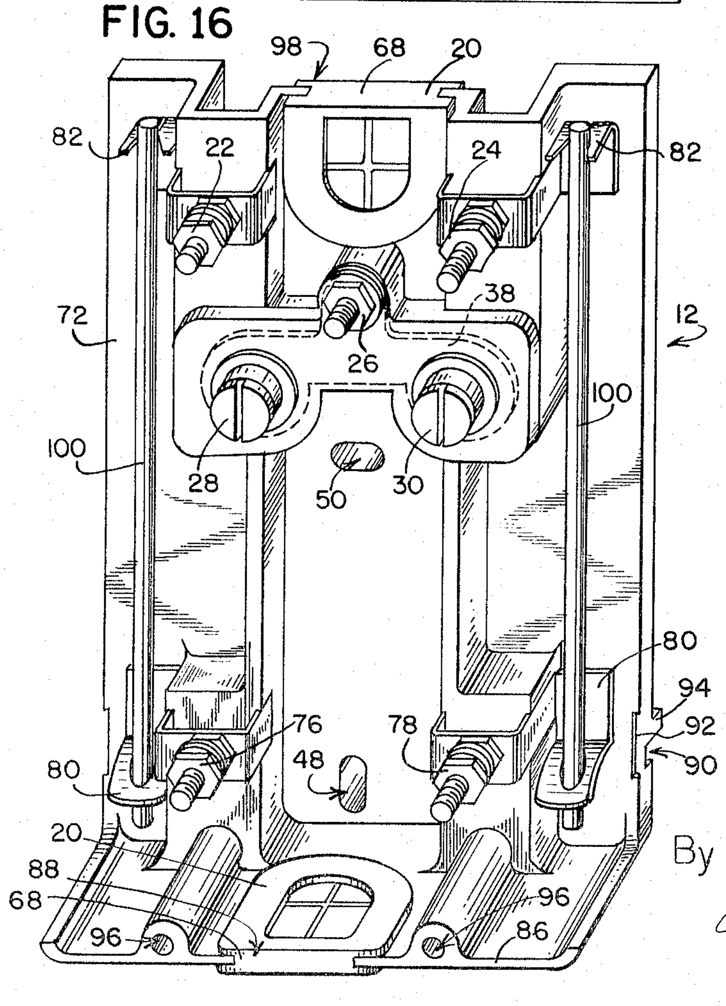
FIGURE 16 is a perspective view of the embodiment of FIGURES 11–13 with the cover removed and with the fuses replaced by shorting bars.

The fuse type protector 12 can operate as a fuseless protector simply by connecting the outside line to the terminals 22 and 24, bypassing the terminals 76 and 78 and the fuses 84. Fuseless operation may also be accomplished without a wiring change by mounting shorting bars 100 in the place of the fuses 84 as shown in FIGURE 16.

Turning to the cover 74, this cover is preferably of the same material as the cover 14, and generally similar thereto.

The cover 74 preferably resiliently engages the base with outwardly flexing stiffly resilient cantilevered side walls 102 and 104. Due to the increased size of the cover 74 as opposed to the cover 14 there is increased leverage arm action. Therefore to preserve the same degrees of stiffness or resiliency in the side walls there is preferably provided additional stiffening means. A preferred construction is the provision of integral transverse stiffening ribs or gussets 103 which extend at intervals between the two side walls and along the top of the cover 74.

Further longitudinal stiffening for each sidewall 102 and 104 is preferably provided by indenting the principal portion of the side wall respective to the remainder thereof so as to form a flange portion 105 extending substantially the length of each side at right angles thereto near the bottom edge. The flange portion 105 provides a surface overlying the edge of the upper surface of the base and thereby provides vertical engagement of the cover 74 with the base 72. This also provides a part of the weather seal therebetween.

The cover 74 is preferably provided with detents 106 at the bottom edge of each side wall near the front thereof. As the front of the cover 74 is rotated downwardly toward the base 72 the detents 106 contact the bevel surfaces 92, which causes the side walls to be forced outwardly. As the cover is forced fully down onto the base each detent 106 overlies a catch recess 90 and is snapped therein by the resilience of the side walls. So engaged, the cover 74 is secured to the base in a covert and tamper proof manner similar to that previously described on the protector 10. The detents 106 and catch recesses 90 provide both a vertical and horizontal retention of the cover 74.

For additional retention, although not essential, additional projections 108 may be provided from the inner surface of the top of the cover 74. Each projection 108 is adapted to fit within a naperture 96 on the base 72.

In the protector 12 the entire protector is weather sealed and tightly enclosed by the cover 74. In previous fuse type protectors it was felt necessary to have vent apertures in the cover to prevent the telephone circuits from being shorted or grounded by the ionized gases produced by the fuse operating. The protector 12 overcomes this problem and thereby enables the elimination of vent openings in the cover. The factors in overcoming gas shorting or grounding include the use of wholly internal electrical interconnections as described above, together with the use of substantially non-gas producing fuses.

Figure 18:
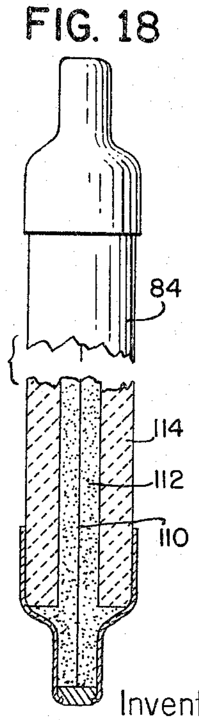
FIGURE 18 is an enlarged plan view partially in axial cross section of the fuse in the embodiment of FIGURES 11–13.

A preferred fuse 84 illustrated in detail in FIGURE 18 is constructed to eliminate any significant external dispersion of ionized gases. A very fine central fuse wire 110, preferably of silver, is provided, having a preferred diameter of approximately .0065 inch. Due to the extremely low mass of this very fine fusible element, when the fuse wire is fused by a current overload only a small volume of ionized gases is produced. Further the fuse wire 110 is preferably entirely enclosed within a substantial core 112 or granular material, preferably silica sand. Voids between the sand particles provide a substantial total space for the expansion of the ionized gases. The sand core 112 is in turn preferably surrounded by a sealed shell 114 such as a porcelain dowel to provide a gas tight enclosure around both the fuse wire 110 and the sand core 112.

It may be seen that there has been provided by the invention described herein a new and improved protector. It is anticipated that various modifications and improvements may be made therein by those skilled in the art, and it is intended to encompass in the accompanying claims all such modifications and improvements as lie within the true spirit and scope of the invention.

What is claimed is:

1. A communications circuit protector comprising:
an insulative base having thereon a plurality of communications circuit electrical elements,
said base having conductors interconnecting with electrical elements,
said base having mounting means for mounting said base,
said base having an aperture for receiving a wire grommet;
said base having a cover engaging portion with first latching means thereon;
cover means removably secured to said base enclosing said electrical elements,
said cover means having a stiffly resilient cantilevered wall portion,
said wall portion having second latching means thereon,
said first and second latching means normally engaging one another and locking said cover means to said base,
both said first and second latching means being externally invisible when engaging one another,
said cover means being removable from said base by said wall portion of said cover means being adapted to flex away from said cover engaging portion of said base sufficiently to disengage said first and second latching means.

2. The communications circuit protector of claim 1 wherein said cover means is a rigid plastic integral unit.

3. The communications circuit protector of claim 2 wherein said plastic is polyvinyl dichloride.

4. The communications circuit protector of claim 1 wherein said base has a pair of projecting mounting collars for fastening said base to a mounting surface, each said collar having an elongated dimension and a correspondingly elongated aperture extending through said collar, said aperture being adapted to receive fastening means therethrough for fastening said base to a mounting surface, said collars being spaced apart with their elongated dimensions fixed at right angles to one another.

5. The communications circuit protector of claim 1 wherein said conductors are internally molded within said base and said cover means weathertightly encloses said base.

6. A communications circuit protector comprising:
an insulative base having thereon a plurality of communications circuit electrical elements,
said base having conductors interconnecting said electrical elements,
said base having mounting means for mounting said base,
said base having an aperture for receiving a wire grommet;
said base having a cover engaging portion with first latching means thereon;
cover means removably secured to said base enclosing said electrical elements,
said cover means having an opposing pair of stiffly resilient cantilevered side walls, a top wall therebetween and a front opening defined by said side walls and said top wall,
at least one of said side walls having second latching means thereon adjacent said front opening,
said first and second latching means normally engaging one another and locking said cover means to said base,
both said first and second latching means being externally invisible when engaging one another,
said cover means being removable from said base by said side wall being adapted to flex away from said cover engaging portion of said base adjacent said front opening sufficiently to disengage said first and second latching means.

7. The communications circuit protector of claim 6 further including an integral stiffening member projecting from said side walls toward said base.

8. The communications circuit protector of claim 6 further including at least one integral stiffening member projecting from said top wall and extending along said top wall between said side walls.

9. The communications circuit protector of claim 6 wherein said conductors are internally molded within said base and said cover means weathertightly encloses said base.

10. In a communications circuit protector the combination comprising:

an insulative base having thereon a plurality of electrical elements including communications circuit terminal means, ground terminal means, and mounting means for over-voltage protectors, said base having internal conductors disposed entirely within said base and interconnecting said electrical elements, said base having a spaced pair of elongated mounting studs projecting therefrom and having corresponding elongated apertures, said elongated studs being disposed at right angles to one another, said base having an upstanding wall with a grommet-receiving aperture;

a grommet mounted in said aperture;

unitary rigid plastic cover means removably secured to and enclosing said base;

said unitary cover means having opposed cantilevered stiffly resilient side walls snugly engaging said base;

and covert latching means retaining said cover means to said base, said latching means including internally projecting detent means on said side walls and mating detent catch means on said base, said stiffly resilient side walls detachably maintaining said detent means and detent catch means in operative engagement.

11. In a communications circuit protector, the combination comprising:

an insulative base having thereon a plurailty of electrical elements including communications circuit terminal means, and mounting means for over-voltage protectors, said base having only fully embedded conductors interconnecting said electrical elements;

said base having a spaced pair of elongate mounting studs projecting therefrom with correspondingly elongate apertures therethrough, said elongate studs being disposed at right angles to one another;

said base having a rear portion with a ledge surface thereon and a front portion having an upstanding wall with an aperture therein for receiving a grommet;

a grommet mounted in said aperture;

and unitary rigid plastic cover means removably sesured to and enclosing said base;

said unitary cover means having a rear wall and a pair of opposing cantilevered and stiffly resilient side walls extending from said rear wall and snugly engaging said base, said walls each having an elongated bottom flange projecting at right angles inwardly of said base, said rear wall having inwardly projecting ledge engagement means overlying said ledge surface on said base;

and covert latching means retaining said cover means to said base, said latching means including internally projecting detent means on said side walls substantially spaced from said rear wall and mating detent catch means on said base, said detent means on said side wall being removably retained against said catch means by said stiffly resilient side walls.

12. In a communications circuit protector, the combination comprising:

an insulative base having a plurality of electrical elements including communications circuit terminal pair means, ground terminal means, mounting means for over-voltage protectors, and mounting means for current overload fuses;

internal conductors interconnecting said electrical elements, said internal conductors being embedded entirely within, and insulated by, said base;

unitary high temperature rigid plastic imperforate cover means removably secured to and tightly enclosing said base so as to substantially weather seal said electrical elements therein said cover means having opposing cantilevered stiffly resilient side walls resiliently engaging said base therebetween;

and effectively gasless current overload fuses removably mounted in said mounting means for current overload fuses.

13. In a communications circuit protector the combination comprising:

an insulative base having a plurality of electrical elements including at least two communications circuit terminal pair means, ground terminal means, mounting means for over-voltage protectors, and mounting means for current overload fuses;

internal conductors disposed entirely within said base and interconnecting said electrical elements;

said base having a spaced pair of elongated mounting studs projecting therefrom with correspondingly elongated apertures therethrough, said elongated studs being disposed at right angles to one another;

said base having a rear portion with a notch for a grommet adjacent to one of said terminal pair means and a front portion adjacent another of said terminal pair means having an upstanding wall with a further notch for further grommet;

a grommet mounted in each said notch and slidably removable therefrom;

unitary rigid plastic cover means removably secured to and enclosing said base, said cover means having portions engaging each said grommet to retain each said grommet in each said notch;

said unitary cover means having opposing cantilevered stiffly resilient side walls closely engaging said base and transverse stiffening means integral with said side walls;

and covert latching means retaining said cover means to said base;

said latching means including internally projecting detent means on said side walls and mating detent catch means on said base;

said stiffly resilient side walls detachably maintaining said detent means and said catch means in operative engagement.

References Cited by the Examiner

UNITED STATES PATENTS

| | | | |
|---|---|---|---|
| 1,724,959 | 8/1929 | Page et al. | 174—153 |
| 2,021,256 | 11/1935 | Gordon | 317—120 |
| 3,142,738 | 7/1964 | Friedman | 317—116 X |

FOREIGN PATENTS

| | | |
|---|---|---|
| Ad. 61,464 | 11/1954 | France. |
| 899,176 | 7/1944 | France. |

ROBERT K. SCHAEFER, *Primary Examiner.*

W. C. GARVERT, *Assistant Examiner.*